United States Patent
Brogan

(10) Patent No.: US 12,119,657 B2
(45) Date of Patent: Oct. 15, 2024

(54) SELECTIVELY ADOPTING A GRID FORMING OPERATION MODE

(71) Applicant: Siemens Gamesa Renewable Energy A/S, Brande (DK)

(72) Inventor: Paul Brian Brogan, Glasgow (GB)

(73) Assignee: SIEMENS GAMESA RENEWABLE ENERGY A/S, Brande (DK)

( * ) Notice: Subject to any disclaimer, the term of this patent is extended or adjusted under 35 U.S.C. 154(b) by 248 days.

(21) Appl. No.: 17/604,911

(22) PCT Filed: Apr. 2, 2020

(86) PCT No.: PCT/EP2020/059345
§ 371 (c)(1),
(2) Date: Oct. 19, 2021

(87) PCT Pub. No.: WO2020/221546
PCT Pub. Date: Nov. 5, 2020

(65) Prior Publication Data
US 2022/0200288 A1 Jun. 23, 2022

(30) Foreign Application Priority Data
May 2, 2019 (EP) .................................... 19172181

(51) Int. Cl.
*H02J 3/38* (2006.01)
*F03D 7/02* (2006.01)
*F03D 7/04* (2006.01)
*H02J 3/24* (2006.01)
*H02J 13/00* (2006.01)

(52) U.S. Cl.
CPC ............ *H02J 3/381* (2013.01); *F03D 7/0284* (2013.01); *F03D 7/048* (2013.01); *H02J 3/24* (2013.01); *H02J 13/00006* (2020.01); *F05B 2270/1033* (2013.01); *H02J 2300/28* (2020.01)

(58) Field of Classification Search
CPC ........ H02J 3/381; H02J 3/24; H02J 13/00006; H02J 2300/28; F03D 7/0284; F03D 7/048; F05B 2270/1033
See application file for complete search history.

(56) References Cited

U.S. PATENT DOCUMENTS

2008/0195255 A1  8/2008  Lutze et al.
2009/0254223 A1  10/2009 Helle et al.
(Continued)

FOREIGN PATENT DOCUMENTS

EP     2605357        6/2013
WO     2009083446 A2  7/2009

OTHER PUBLICATIONS

European Search Report issued on Nov. 13, 2019 for application No. 19172181.0.
(Continued)

*Primary Examiner* — Jeffrey M Shin
(74) *Attorney, Agent, or Firm* — Schmeiser, Olsen & Watts LLP

(57) ABSTRACT

Provided is a method of controlling a wind turbine or a wind park including at least one wind turbine connected to a utility grid for utility grid support, the method including: receiving a control command from a utility grid manager, and selectively controlling the wind turbine according to the control command.

13 Claims, 3 Drawing Sheets

(56) References Cited

U.S. PATENT DOCUMENTS

Figure 1:
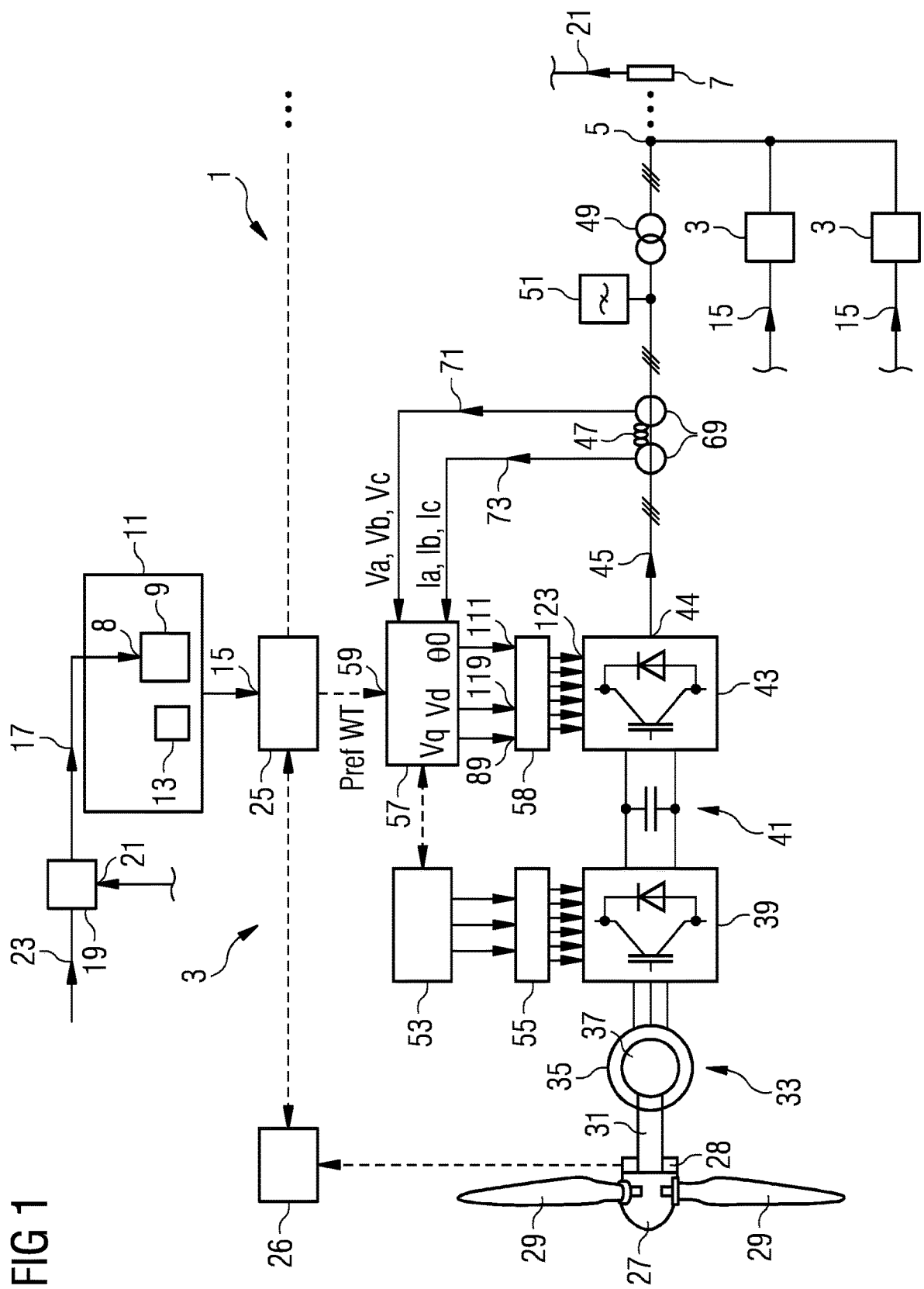

| | | |
|---|---|---|
| 2010/0109447 A1 | 5/2010 | Achilles et al. |
| 2013/0001946 A1 | 1/2013 | Nielsen et al. |
| 2013/0043725 A1 | 2/2013 | Birkelund |
| 2015/0022007 A1 | 1/2015 | Ma et al. |
| 2015/0137520 A1* | 5/2015 | Garcia .................... F03D 9/255 |
| | | 290/44 |

OTHER PUBLICATIONS

International Search Report issued on Jul. 20, 2020 for application No. PCT/EP2020/059345.

* cited by examiner

SELECTIVELY ADOPTING A GRID FORMING OPERATION MODE

CROSS-REFERENCE TO RELATED APPLICATIONS

This application claims priority to PCT Application No. PCT/EP2020/059345, having a filing date of Apr. 2, 2020, which is based off of EP Application No. 19172181.0, having a filing date of May 2, 2019, the entire contents both of which are hereby incorporated by reference.

FIELD OF TECHNOLOGY

The following relates to a method of controlling a wind turbine or a wind park comprising at least one wind turbine connected to a utility grid for utility grid support, relates further to an arrangement for controlling a wind turbine or wind park. Further, the following relates to a wind turbine or a wind park comprising the arrangement.

BACKGROUND

Conventionally, a wind park is connected to a utility grid to provide electric energy to plural consumers. Occasionally, utility grid disturbances occur, involving for example change of voltage and/or change of frequency. In particular, when there is an unbalance between produced power and consumed power, the frequency of the utility grid may change. Further, the voltage in the utility grid may drop for example in case of a fault, such as a short-circuit or lightning strike. In case of such grid disturbances, conventionally, wind turbines may provide utility grid support involving injecting additional active power or additional reactive power.

To date the operating mode of a windfarm does not change by a command from the TSO. The voltage demand, reactive power reference/limit, or power factor reference/limit or Power limit may be set, but the fundamental operating mode of the wind farm and wind turbine control remains fixed and thus the response provided to the power system to an undesirable event (like a fault) is fixed usually by pre programmed parameters.

The problem faced by the TSO's in many countries is that as the level of non-synchronous generation increases, for example converter connected generation like, wind, Photovoltaic, wave, increases then synchronous generating power stations, with large synchronously rotating machines, like coal fire power stations, are being shut down. This is causing a reduction in the system inertia, and fault current, to levels which are not believed to provide stable operation of the power system as a whole.

Thus, there may be a need for a method and arrangement of controlling a wind turbine or a wind park for utility grid support, which more reliably support the utility grid in terms of restoring nominal values of voltage and/or frequency for example.

SUMMARY

According to an embodiment of the present invention it is provided a method of controlling a wind turbine or a wind park comprising at least one wind turbine connected to a utility grid for utility grid support, the method comprising: receiving a (utility grid support) control command from a utility grid manager; controlling the wind turbine according to a mode selected by the control command.

The control command may be asynchronous to the grid disturbance event which may happen on the power system e.g. at a later point in time. The control command may set the Wind turbine in a mode where it will respond if and when an event (e.g. frequency drop or increase) occurs on the power system.

The method may for example be performed by an arrangement for controlling a wind turbine or a wind park according to an embodiment of the present invention. Thereby, the method may in particular be performed by a wind turbine controller or a wind park controller. The fast response like VSM may be provided by the Wind turbine controller.

The utility grid may be a regional grid or a national grid or an international electrical power grid. Utility grid support may be required in the case the electrical characteristic of the utility grid (for example regarding voltage and/or frequency) does not satisfy a nominal characteristic, for example does not comply with a nominal frequency and a nominal voltage. Utility grid support may involve injecting additional active power and/or additional reactive power into the utility grid from the wind turbine or from the entire wind park. Utility grid support may however also comprise to prepare for additional injection of active power and/or additional injection of reactive power. Thus, utility grid support may also involve to reduce for example active power output of the wind turbine such as to enable to increase the output of active power of the wind turbine in a later situation when additional injection of active power is required, in particular in the case where the utility grid frequency drops below a nominal frequency.

The utility grid manager is a party managing an electrical power utility grid, such as a regional, a national or an international electrical power utility grid. The utility grid manager may be different from a wind turbine operator or wind park operator. Conventionally, the utility grid manager may not be able to selectively control a wind park or a wind turbine by a control command which is related to utility grid support, thereby e.g. an wind turbine operational mode. Conventionally, the wind turbine or the wind park may be controlled by a respective wind turbine controller or a wind park controller. However, according to this embodiment of the present invention, the utility grid manager has, at least in a situation requiring utility grid support or in a situation where the requirement of utility grid support can be anticipated, the ability to dispatch a control command to the wind turbine or the entire wind park, in particular causing a change in the operation mode.

The wind turbine and the wind park are respectively configured to receive the control command from the utility grid manager, requiring respective communication modules which are communicatively connected with the utility grid manager. Controlling the wind turbine or the wind park according to a mode selected by the control command may involve that the wind turbine controller autonomously controls the components of the wind turbine, e.g. based on grid measurement signals regarding voltage and/or current and/or frequency.

The control command from the utility grid manager may involve the indication to switch an operational mode. The control command may for example indicate to the wind turbine to switch to a utility grid disturbance anticipating mode or to a utility grid stability support mode. The utility grid disturbance anticipating mode or utility grid stability support mode may for example cause the wind turbine to reduce power output (for example at a particular time or in a particular time interval) such as to enable the wind turbine to increase the (in particular active) power output in a later point in time when actually a utility grid disturbance occurs, and this is beneficial to the utility grid, it may provide inertia or synthetic inertia. The utility grid stability support operational mode may involve operating the wind turbine such as to output for example additional active power and/or additional reactive power in order for restoring for example a nominal frequency and/or a nominal voltage of the utility grid.

According to an embodiment of the present invention, the control command is selectively dispatched by the utility grid manager in expectation and/or dependence of a present and/or forthcoming utility grid disturbance. Thus, the control command may only be dispatched by the utility grid manager if a utility grid disturbance is either anticipated or predicted or expected or is actually present. In all other cases, the utility grid manager may not dispatch or supply any control command to the wind turbine or the wind park. Thereby, utility grid support may be improved.

According to an embodiment of the present invention, the control command indicates to provide active power capability (e.g. system inertia) and/or reactive power capability and/or power oscillation damping capability and/or fault current capability immediately or in the future.

Active power capability may involve providing more active power output than nominally output. The additional active power output may for example be taken from rotational energy of the rotor of the wind turbine. When more active power is output than nominally, the rotational speed of the rotor may decrease. Reactive power capability may involve to output an increased amount of reactive power compared to a nominally output reactive power. Supplying an increased amount of reactive power output to the utility grid may restore the nominal voltage of the utility grid. Power oscillation damping capability may involve to inject oscillating amount of active power and/or reactive power for damping power oscillations within the grid.

According to an embodiment of the present invention, the control command indicates a level of active power capability and/or a level of reactive power capability and/or a level of power oscillation damping capability and/or a level of fault current capability and/or a time interval when at least one of these capabilities should be available. When the level of these capability is also specified within the control command, the respective grid electrical disturbance may in an improved manner be counteracted. Furthermore, when the time interval when at least one of these capabilities should be available is specified within the control command, the wind turbine may be, in an improved manner, prepared for actually providing the required capability at the indicated time interval.

To prepare the wind turbine to actually be able to provide the required capability in the future or in particular in the respective time interval, the wind turbine may for example be operated to reduce active power output, below what could nominally be produced by the wind turbine for the give wind conditions, before the time interval or the future point in time or may for example store additional energy in an energy storage. This is operating the wind turbine 'curtailed' so the wind turbine operates outputting less power than it could do, such that it can increase its power output in a beneficial manner towards the power system, if a system event happens. So the inertia provided by the wind turbine is increased during this commanded operational mode.

According to an embodiment of the present invention, the inertial constant is between 2 seconds and 7 seconds, and the ability to provide active power capability is greater than the present wind turbine operational power as it is running curtailed.

According to an embodiment of the present invention, a (e.g. utility grid power) converter control command in accordance with the control command is derived and is supplied to a power converter of the wind turbine, in particular a utility grid power converter. In particular, the control command from the utility grid manager may be supplied or sent to a wind turbine controller or a respective wind park controller. The respective wind turbine controller or wind park controller may receive the control command from the utility grid manager and may process the control command to derive a for example utility grid power converter control command which may be adapted to appropriately control the utility grid power converter taking into account particularities of the particular implementation or structural constitution of the utility grid power converter.

The utility grid side power converter (of the wind turbine) may for example be or comprise a DC-AC converter comprising plural controllable switches which may be controlled (for example via respective gate control signal) at their gates for converting a substantially DC current power stream to a fixed frequency AC power stream. Controlling the utility grid power converter may efficiently and reliably change the output of the entire wind turbine or wind park in case of utility grid disturbances or in anticipation or immediately in response to utility grid disturbances. Downstream the utility grid power converter, a wind turbine transformer may be present which may, via for example a point of common coupling, be connected to the utility grid, in particular via one or more wind park transformers.

According to an embodiment of the present invention, the control command indicates the wind turbine, in particular a grid side power converter, to switch, immediately or at a future time interval or a future point in time, to a grid forming mode of operation, in particular from a current control mode.

Conventionally, a wind turbine may be operated in a current control mode, wherein the output current is controlled to adhere to a nominal value. The grid forming mode of operation however may be different from a current control mode. The grid forming mode of operation may be an operational mode providing utility grid support in case of a utility grid disturbance, in particular voltage drop and/or frequency drop, or power oscillation.

The utility grid power converter may also be referred to as the network bridge power converter in the context of embodiments of the present invention.

One of the proposed solutions to the issue of system inertia and fault current is a "Grid forming" network bridge power converter control algorithm. One of the attributes of a grid forming power converter is that it acts to provide a greater dynamic energy exchange between the AC system loads and generators, in a similar manner to a synchronous generator. This is in contrast to the present DQ current control which acts to reject any disturbance coming from the AC system and acts to track its own internal active/reactive power references. This conventional control may be beneficial to the converter connected equipment and allows for efficient use of the converter hardware, but less beneficial to the AC system as it effectively leaves the 'other' AC generators on the system to provide the dynamic energy buffer (both real and reactive power) between the prevailing load and connected generation.

The grid forming control may have a series of desired characteristics:
Speed and phase of delivery of fault current
System inertia
Improved fault level
Each converter should behave like a 3 phase balanced voltage source behind an inductance
Each converter could have an inertial constant of a number of seconds
Rapid changes in phase voltage, frequency and phase angle will result in instantaneous dynamic power flow.
Each converter should have the overload capability to withstand the peak power drawn during a frequency event with maximum expected RoCoF.

The grid forming mode of operation may be implemented in several different manners. In the following, a particular implementation and configuration is described as an exemplary embodiment.

According to an embodiment of the present invention, the grid forming mode of operation involves: deriving a frequency error between an actual grid frequency and a nominal grid frequency; deriving a grid side power converter control signal based on the frequency error; and controlling the grid side power converter based on the grid side power converter control signal.

According to an embodiment of the present invention, the grid forming mode of operation involves: measuring voltage and current at an output terminal of a grid side power converter; calculating the power output from the grid side power converter based on the measured voltage and current; deriving, in particular by a power controller, a representation/view of the (power converter and/or utility grid) frequency based on the calculated power output; deriving a frequency error between the derived representation of the frequency and a nominal frequency; deriving a grid side power converter control signal based on the frequency error; controlling the grid side power converter based on the grid side power converter control signal.

According to this embodiment, a measurement of the utility grid frequency may not be required. In particular, all three phases of the voltage and/or the current at the output terminal of the grid side power converter may be measured, in particular at the low voltage side of the wind turbine transformer which may be connected to the output terminal of the grid side power converter. In particular, from the three-phase current and voltage measurements, the power and AC voltage are calculated and the power is used to determine the controller's representation or "view" of the AC grid frequency. The controller may look like a voltage source behind an impedance. It may typically be a low bandwidth control and in the event of a system frequency change (for example utility grid frequency change) dynamic power flow may result, until the power controller has had time to respond and track the system frequency. It is this that gives the network bridge its inertial characteristic according to an embodiment of the present invention.

As mentioned before, other implementations of a grid forming mode of operation are possible.

The grid side power converter control signal may be a signal which is supplied to the grid side power converter based on which the grid side power converter controls its respective controllable switches, in particular by supplying respective pulse width modulation signals to the gates of the controllable switches. The grid side power converter control signal may be dependent on other quantities additionally to the frequency error.

According to an embodiment of the present invention, the grid forming mode of operation further involves: deriving, in particular by a voltage controller, a first voltage signal (e.g. Vq) based on a difference between the measured voltage of the output terminal of the grid side power converter and a nominal voltage; deriving, in particular by a voltage feedforward controller, a second voltage signal (e.g. Vd) based on an output current (e.g. Id) of the grid side power converter and in particular a nominal power output; deriving the grid side power converter control signal based on the frequency error, the first voltage signal (e.g. Vq) and the second voltage signal (e.g. Vd).

The first voltage signal may be a q-component of the voltage in a d-q coordinate system rotating with the electrical frequency of the generator of the wind turbine. The difference between the measured voltage of the output terminal of the grid side power converter and a nominal voltage may be determined involving forming differences between all three phases of the measured voltage and the nominal voltage and adding the phase differences squared and taking the square root of the sum of differences of squares of phase differences. Other calculations are possible.

The voltage controller may comprise, in order to derive the first voltage signal a PI-controller to which the difference between the measured voltage and the nominal voltage is supplied. The power controller may also comprise a PI-controller to which the difference of the calculated power output and the nominal power output is supplied. The second voltage control signal may for example be a d-component of the voltage in the d-q coordinate system.

According to an embodiment of the present invention, the grid forming mode of operation involves the grid side power converter behaving similar to a voltage source behind an impedance, in particular performing low bandwidth control, in typically control below 5 Hz.

Conventionally, wind turbines may be controlled according to a current control mode. Operating the wind turbine such as to behave similar to a voltage source may improve utility grid support.

According to an embodiment of the present invention, the utility grid manager is at least one of: a utility grid operator; a transmission system operator; a party responsible for managing the generation and/or load mix connected to the electrical power system or utility grid; a party operating a national or international electrical power grid.

The utility grid manager may have knowledge (for example using appropriate measurement equipment) of the electrical characteristic of the utility grid. Further, the utility grid manager may have at hand prediction tools or other information sources which may provide information regarding forthcoming events which may affect utility grid electrical behaviour. These kinds of information sources may not be available at the wind turbine or wind park level.

According to an embodiment of the present invention, the utility grid manager takes responsibility for reimbursing the wind turbine operator for any profit loss due to adhering to the control command from the utility grid manager. The effects of the control command issued or dispatched by the utility grid manager may be monitored for example by measuring or estimating the active power and/or reactive power not supplied to the grid due to the control command by the utility grid manager. Based on the monitoring, the reimbursement of the operator of the wind turbine may be calculated.

It should be understood, that features, individually or in any combination, disclosed, described explained or applied to a method of controlling a wind turbine or a wind park may also apply, individually or in any combination, to an arrangement for controlling a wind turbine or a wind park according to an embodiment of the present invention and vice versa.

According to an embodiment of the present invention it is provided an arrangement for controlling a wind turbine or a wind park comprising at least one wind turbine connected to a utility grid for utility grid support, the arrangement comprising: an input section adapted to receive a control command from a utility grid manager; a processor adapted to selectively control the wind turbine according to the control command, the arrangement in particular being adapted to carry out a method according to one of the preceding embodiments.

The arrangement may for example be a part or a module (software and/or hardware) of a wind turbine controller or a wind park controller.

According to an embodiment of the present invention it is provided a wind turbine, comprising: a generator; a generator side power converter electrically coupled to the generator; a grid side power converter electrically coupled to the generator side power converter, in particular via a DC-link; and an arrangement according to the preceding embodiment, in particular being part of a wind turbine controller or wind park controller.

According to an embodiment of the present invention it is provided a wind park comprising: plural wind turbines; an arrangement according to an above embodiment; and a distribution module for distributing individual wind turbine control signals to the wind turbines based on the control command.

Furthermore, a power generation system is provided, including the utility grid, the utility grid manager and one or more wind parks according to embodiments of the present invention. The utility grid manager is communicatively connected to the wind park controllers or respective wind turbine controllers enabling to supply a control command to the respective wind turbines or the wind parks.

Under certain conditions the Grid operator, or Transmission system operator (TSO) may be aware of conditions whereby the electrical system could, and is expected to be put under stress. Such conditions are perhaps due to outages of synchronous generators, bad weather, failure of HVDC interconnections, unavailability of power factor correction equipment. When such events can be forseen, the TSO may be able, according to an embodiment of the present invention, to configure a windfarm in such a way that it provides 'system support' in a manner which is not its normal steady state operating mode. Additionally the TSO may be able to increase certain services that a wind power plant (or converter connected generation to be more generic) provides to the AC power system, and they may be able to choose to do so due to the status of the electrical power system, in regard to what other generation sources (for example synchronous generators) are in operation. The TSO may also choose to pay for these services as and when they require them, at the TSO's discretion if you like.

The aspects defined above and further aspects of embodiments of the present invention are apparent from the examples of embodiment to be described hereinafter and are explained with reference to the examples of embodiment. Embodiments of the invention will be described in more detail hereinafter with reference to examples of embodiment but to which the invention is not limited.

BRIEF DESCRIPTION

Figure 2:
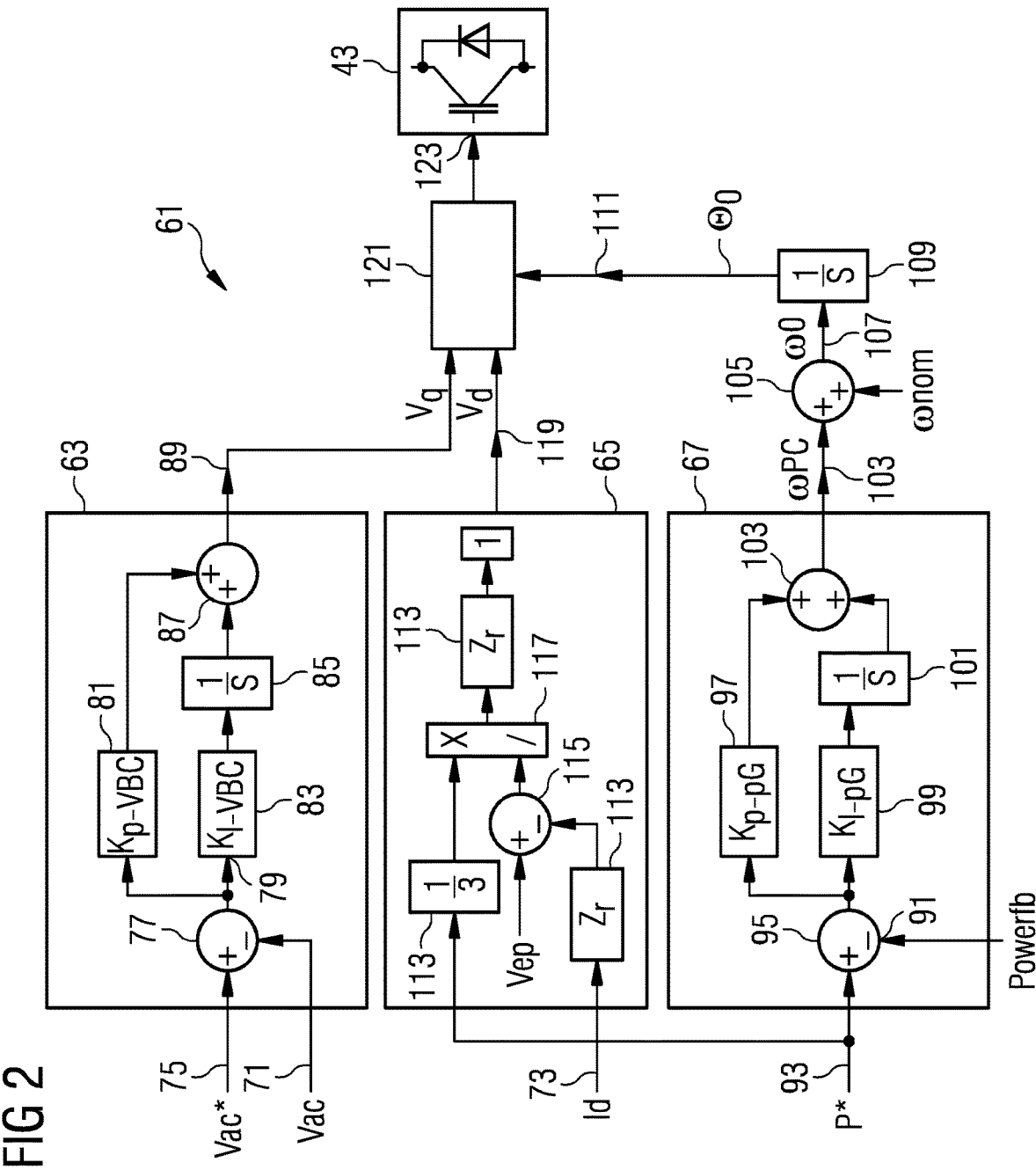
Figure 3:
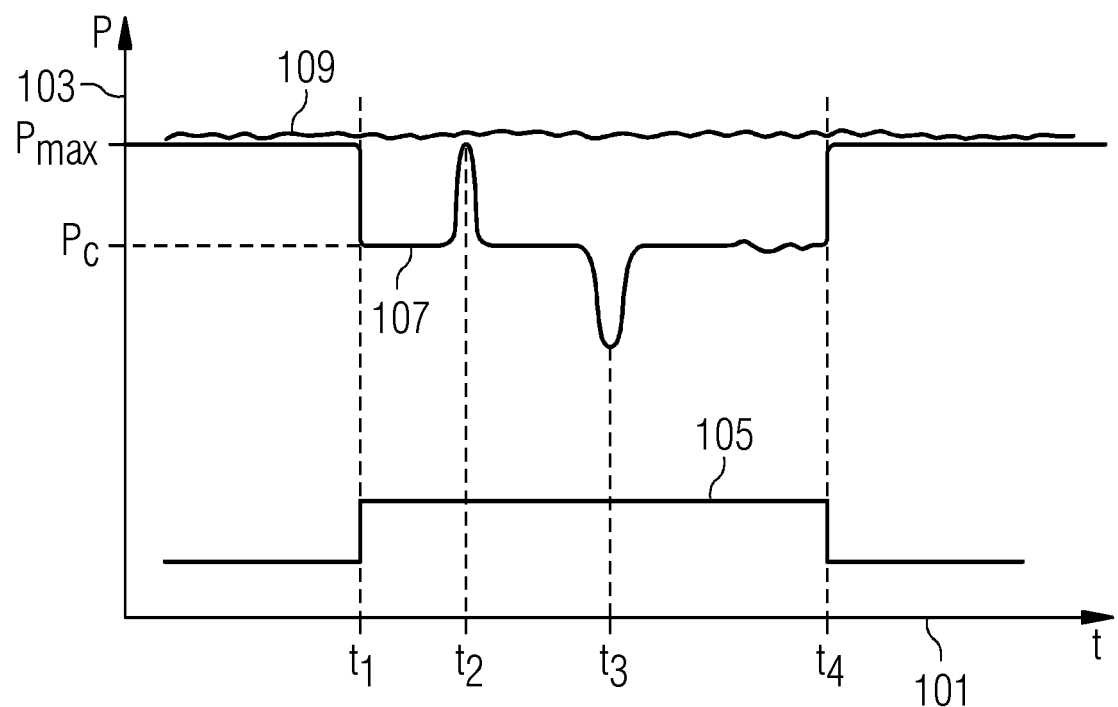

Some of the embodiments will be described in detail, with reference to the following figures, wherein like designations denote like members, wherein:

FIG. 1 schematically illustrates a wind park according to an embodiment of the present invention including a wind turbine according to an embodiment of the present invention;

FIG. 2 schematically illustrates an implementation of a grid forming operational mode according to an embodiment of the present invention which may for example be comprised in an arrangement for controlling a wind turbine or a wind park according to an embodiment of the present invention; and FIG. 3 illustrates wind turbine control modes as selected by the control command from the grid manager according to an embodiment of the present invention.

DETAILED DESCRIPTION

The wind park 1 schematically illustrated in FIG. 1 comprises plural wind turbines 3 which are connected to a point of common coupling 5 which is connected to a utility grid 7 (in particular via one or more wind park transformers). The wind park 1 (or each wind turbine 3) comprises an arrangement 9 for controlling a wind park or a wind turbine according to an embodiment of the present invention. The arrangement 9 is part of a wind park (or wind turbine) controller 11 which further comprises a distribution module 13 for distributing individual wind turbine control signals 15 to the wind turbines 3 based on a control command 17 received from a utility grid manager 19. The utility grid manager 19 receives measurement values 21 as measured or estimated by monitoring equipment of the utility grid 7. Furthermore, the utility grid manager 19 receives additional information 23 regarding potential upcoming disturbances of the utility grid for example. Like weather, storms, unusual load conditions, power station problems/shutdown.

Each wind turbine 3 comprises a wind turbine controller 25 which receives the respective individual wind turbine control signal 15 as supplied from the wind park controller 11.

The wind turbine 3 comprises a hub 27 at which plural rotor blades 29 are connected. The hub 27 is connected to a rotor 31 which is coupled to a generator 33 comprising a generator rotor 35 and a generator stator 37. The generator 33 outputs a power stream to a generator side converter 39 which generates a substantially DC power stream which is output to a DC-link 41. The DC-link 41 is connected to a grid side power converter 43 which outputs (at output terminal 44) a grid side power converter output power 45, which is supplied via an inductor 47 to a wind turbine transformer 49 which is coupled to the point of common coupling 5. The wind turbine further comprises a filter 51. There may usually be a breaker connected between the inductor and the turbine transformer and a shunt filter.

The generator side power converter 39 is controlled by a respective generator side converter controller 53 and a pulse width generation module 55. The grid side power converter 43 is controlled by a respective grid side power converter controller 57 and a connected pulse width generation module 58. The wind turbine controller 25 controls the utility grid converter controller 57 by a grid side power converter control signal 59 which is derived by the wind turbine controller 25 based on the individual wind turbine control signal 15 received from the wind park controller 11. The wind turbine controller 25 (and/or the generator side converter controller 53) may for example be instructed by the individual wind turbine control signal 15 (or the grid side converter control signal 59) to perform a grid forming mode of operation.

A pitch controller 26 of the wind turbine 3 is also controlled by the wind turbine controller 25. The pitch controller 26 controls the operation of a pitch adjustment system 28, which is responsible for setting, depending on the actual operational state of the wind turbine 3, the blade pitch angle of each rotor blade 29.

FIG. 2 schematically illustrates an example of an implementation of a grid forming control algorithm 61 as may for example be performed by the wind turbine controller 25 and/or the grid side converter controller 57 illustrated in FIG. 1. The implementation 61 of the grid forming algorithm comprises a voltage controller 63, a voltage feedforward controller 65, and a power controller 67.

The voltage measurement equipment 69 (see FIG. 1) measures voltages Va, Vb, Vc (collectively referred to as voltage measurement signal 71) and currents Ia, Ib, Ic (collectively referred to as current measurement signal 73) at the output terminal 44 of grid side power converter 43 of the wind turbine 3 and supplies these measurement signals to either the grid side converter controller 57 or the wind turbine controller 25.

The voltage controller 63 illustrated in FIG. 2 receives the voltage measurement signal 71 (Vac) and also receives a nominal voltage 75 (Vac*). Using a difference element 77, a difference 79 is calculated and supplied to multiplication elements 81, 83. The output of the multiplication element 83 is supplied to an integrator 85. The output of the multiplication element 81 and the output of the integration element 85 are added by the summation element 87 to provide a voltage controller output 89 representing a first voltage signal $V_q$.

The power controller 67 receives a power signal 91 indicative of the output power 45 which is calculated based on the measured voltage 71 and the measured current 73. The power output 45 is subtracted from a nominal power 93 (P*). The power 45 is subtracted from the nominal power 93 by a subtraction element 95. Multiplication elements 97, 99 and an integration element 101 and an addition element 103 implement a PI-controller. The power controller output 103 represents a representation/view of the frequency $\omega_{PC}$ of the power controller 67. By a difference element 105, a frequency error 107 ($\omega_0$) is derived and is integrated by an integration element 109 resulting in an electrical angle 111 ($\theta_0$).

The feedforward module 65 receives the d-component of the current 73 (Id) and further the nominal power 93 (P*). Using respective multiplication 113 and difference elements 115 and multiplication elements 117, a second voltage signal 119 (Vd) is output.

A pulse width generation module 121 receives the first voltage signal 89, the second voltage signal 119 as well as the angle signal 111 and derives a pulse width modulation signal 123 which is supplied to the grid side power converter 43 also illustrated in FIG. 1.

Embodiments of the present invention may provide the following features:

Under a command from the TSO or external system operator the wind farm and WTG's changing their operating mode. This command may be sent via communications channels, Ethernet or similar, or perhaps be part of a market mechanism. The conventional steady state operating mode of a wind turbine is that the network bridge operates in current control, and is this a 'voltage follower', it does not behave in such a manner to 'strengthen' the AC system. As the levels of non synchronous generation increase the stability and robustness of the system is degraded, furthermore outages of synchronous generation compound this problem.

There is the possibility that a WTG could operate in such a 'Grid Forming' manner, and provide system inertia, or enhanced reactive power capability, or additional power oscillation damping capability. It is possible that in providing this capability the WTG will no longer be operating at its 'optimal energy production' and it is possible that it is not necessary to operate this windfarm in this mode on a continuous basis.

It is possible to select that the wind farm and WTG's can change operational mode, under instruction from the utility system operator, perhaps automatically, and change operational mode.

The additional capabilities that could be provided are:
Increased inertia or selectable inertia constant by the TSO to match system needs
Additional reactive power
Possibly additional fault current, depending on rating of the equipment and curtailed power level
Act to actively improve voltage unbalance
The consequences may involve:
Perhaps run WTG or wind farm power curtailed to maintain the ability to increase power production on demand by a pre selected percentage.
Change the network bridge control algorithm to achieve above.
Reserve DC link voltage margin to enable above.

The key point may be that these modes can be selected by the TSO, such as 'Grid Forming mode' in response to their observations of system operation.

The wind turbines may operate in current control mode and then without stopping revert to Grid forming mode, OR, the wind turbines operate in grid forming all the time, but can change their gains to offer additional system inertia when required, and/or provide additional correction for voltage unbalance. Depending on the operating power perhaps some additional fault current could be made available.

The grid forming algorithm may for example be implemented or performed as described above. Other implementations are possible.

FIG. 3 illustrates wind turbine control modes as selected by the control command from the grid manager according to an embodiment of the present invention. The abscissa 101 indicates time, the ordinate 103 indicates active output power of the wind turbine. The curve 105 indicates a control command transmitted from a grid manager to the wind turbine according to an embodiment of the present invention. Between time points t1 and t4 the control command indicates to the wind turbine to switch to a grid forming mode of operation. According to the example indicated, the output power 107 of the wind turbine drops at t1 from a maximal value Pmax to a value Pc below the available (according to wind condition) power 109 to allow power increase at a time t2 at which a frequency drop of the utility grid occurs. Due to the increase power output around t2 the grid recovers from the disturbance. At t3 the output power of the wind turbine decreases even further below Pc to counteract a frequency increase of the utility grid. Before t1 and after t4 the control command 105 indicates to the wind turbine to adopt a normal operation in which the power output is substantially held at Pmax, identical or close to the available power 109. A control command similar to command 105 may also be generated for reactive power.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. A method of controlling a wind turbine or a wind park comprising at least one wind turbine connected to a utility grid for utility grid support, the method comprising:
   receiving a control command from a utility grid manager; and
   controlling the at least one wind turbine according to a mode selected by the control command, wherein the control command indicates the at least one wind turbine to switch immediately or at a future time interval or a future point in time, to a grid forming mode of operation, the grid forming mode of operation comprising:
   measuring voltage and a current at an output terminal of a grid side power converter;
   calculating a power output from the grid side power converter based on the voltage and the current;
   deriving, by a power controller, a representation of a utility grid frequency based on the power output;
   deriving a frequency error between the representation of the utility grid frequency and a nominal utility grid frequency;
   deriving a grid side power converter control signal based on the frequency error; and
   controlling the grid side power converter based on the grid side power converter control signal.

2. The method according to claim 1, wherein the control command is selectively dispatched by the utility grid manager in expectation or dependence of a present and/or forthcoming utility grid disturbance.

3. The method according to claim 1, wherein the control command indicates to provide active power capability, reactive power capability, power oscillation damping capability, or fault current capability immediately or in the future.

4. The method according to claim 1, wherein the control command indicates a level of active power capability, a level of reactive power capability, a level of power oscillation damping capability, a level of fault current capability, or a time interval when at least one of these capabilities should be available.

5. The method according to claim 1, wherein a converter control command in accordance with the control command is derived and is supplied to a power converter of the at least one wind turbine.

6. The method according to claim 1, wherein the control command indicates the at least one wind turbine to switch to the grid forming mode of operation from a current control mode.

7. The method according to claim 1, wherein the grid forming mode of operation further comprises:
   deriving, by a voltage controller, a first voltage signal based on a difference between the voltage at the output terminal of the grid side power converter and nominal voltage;
   deriving, by a voltage feedforward controller, a second voltage signal based on an output current of the grid side power converter and a nominal power output; and
   deriving the grid side power converter control signal based on the frequency error, the first voltage signal and the second voltage signal.

8. The method according to claim 1, wherein the grid forming mode of operation involves the grid side power converter behaving similar to a voltage source behind an impedance, performing low bandwidth control below 5 Hz or between 5 Hz and 1 kHz.

9. The method according to claim 1, wherein the utility grid manager comprises at least one of:
   a utility grid operator;
   a transmission system operator;
   a party responsible for managing the generation and/or load mix connected to the electrical power system or utility grid; and
   a party operating a national or international electrical power grid.

10. The method according to claim 1, further comprising reimbursing a wind turbine operator for any profit loss due to adhering to the control command from the utility grid manager.

11. An arrangement for controlling a wind turbine or a wind park comprising at least one wind turbine connected to a utility grid for utility grid support, the arrangement comprising:
    an input section configured to receive a control command from a utility grid manager; and
    a processor configured to control the at least one wind turbine according to a mode selected by the control command;
    wherein the arrangement is configured to carry out the method according to claim 1.

12. A wind turbine, comprising:
    a generator;
    a generator side power converter electrically coupled to the generator;
    a grid side power converter electrically coupled to the generator side power converter; and
    the arrangement according to claim 11, which is a part of a wind turbine controller or wind park controller.

13. A wind park, comprising:
    a plurality of wind turbines;
    the arrangement according to claim 12; and
    a distribution module for distributing individual wind turbine control signals to the plurality of wind turbines based on the control command.

* * * * *